US012759451B2

(12) United States Patent
Hidaka et al.

(10) Patent No.: US 12,759,451 B2
(45) Date of Patent: Oct. 13, 2026

(54) VEHICLE

(71) Applicant: KAWASAKI MOTORS, LTD., Akashi (JP)

(72) Inventors: Kota Hidaka, Lincoln, NE (US); Ken Nagata, Lincoln, NE (US); Hirotaka Fujiki, Akashi (JP); Chase Nickle, Lincoln, NE (US); Loran Fortik, Lincoln, NE (US)

(73) Assignee: KAWASAKI MOTORS, LTD., Akashi (JP)

( * ) Notice: Subject to any disclaimer, the term of this patent is extended or adjusted under 35 U.S.C. 154(b) by 326 days.

(21) Appl. No.: 18/425,070

(22) Filed: Jan. 29, 2024

(65) Prior Publication Data

US 2025/0242738 A1 Jul. 31, 2025

(51) Int. Cl.
*B60N 3/02* (2006.01)
*A63B 55/60* (2015.01)

(52) U.S. Cl.
CPC ................ *B60N 3/02* (2013.01); *A63B 55/61* (2015.10)

(58) Field of Classification Search
CPC .................................. B60N 3/02; A63B 55/61
See application file for complete search history.

(56) References Cited

U.S. PATENT DOCUMENTS

| | | | | | |
|---|---|---|---|---|---|
| 4,023,827 | A * | 5/1977 | Matalonis | B60N 2/24 | 280/756 |
| 5,842,732 | A * | 12/1998 | Daggett | B60J 7/1657 | 296/107.17 |
| 6,293,616 | B1 | 9/2001 | Williams et al. | | |
| 7,934,760 | B2 | 5/2011 | Jagasia et al. | | |
| 10,538,272 | B2 * | 1/2020 | Nada | B60R 21/13 | |
| 10,994,785 | B2 * | 5/2021 | Deckard | B60R 21/13 | |
| 11,034,273 | B2 * | 6/2021 | Gulledge | B60J 7/104 | |
| 11,667,334 | B2 * | 6/2023 | Zaremba | B60R 11/00 | 296/213 |
| 2002/0014790 | A1 * | 2/2002 | Hynds | B60J 7/08 | 296/213 |
| 2003/0209918 | A1 * | 11/2003 | Cheek | B60J 7/106 | 296/1.02 |

FOREIGN PATENT DOCUMENTS

| | | | | |
|---|---|---|---|---|
| DE | 102008030385 | A1 * | 1/2009 | B60R 11/00 |
| DE | 202010016191 | U1 * | 3/2011 | A62C 27/00 |
| JP | 2002283850 | A * | 10/2002 | |
| KR | 20050054226 | A * | 6/2005 | A61L 2/10 |
| KR | 20060106680 | A * | 10/2006 | A63B 55/61 |
| KR | 20090040234 | A * | 4/2009 | A63B 55/61 |

OTHER PUBLICATIONS

JP 2002102402 A (Year: 2002).*

* cited by examiner

*Primary Examiner* — Lori Lyjak
(74) *Attorney, Agent, or Firm* — XSENSUS LLP

(57) ABSTRACT

A vehicle includes: at least one seat including a seat surface; and at least one pole including a rod higher than the seat surface. The rod includes a main body and a handle extending from the main body with bends so that an occupant to be seated on the at least one seat can grasp the handle.

20 Claims, 9 Drawing Sheets

VEHICLE

BACKGROUND OF THE INVENTION

Field of the Invention

This disclosure relates to a handle structure in a vehicle.

Background Art

U.S. Pat. No. 6,293,616 B1 discloses a technology of retrofitting a handle to a rail supporting a roof.

U.S. Pat. No. 7,934,760 B2 discloses a technology of retrofitting a handle to a pillar.

SUMMARY

A vehicle according to one aspect includes: at least one seat including a seat surface; and at least one pole including a rod higher than the seat surface, the rod including a main body and a handle extending from the main body with bends so that an occupant to be seated on the at least one seat can grasp the handle.

In this vehicle, integration of the handles with the poles can prevent an increase in the number of components and easily provide the handles.

DESCRIPTION OF THE PREFERRED EMBODIMENTS

Embodiment

Figure 1:
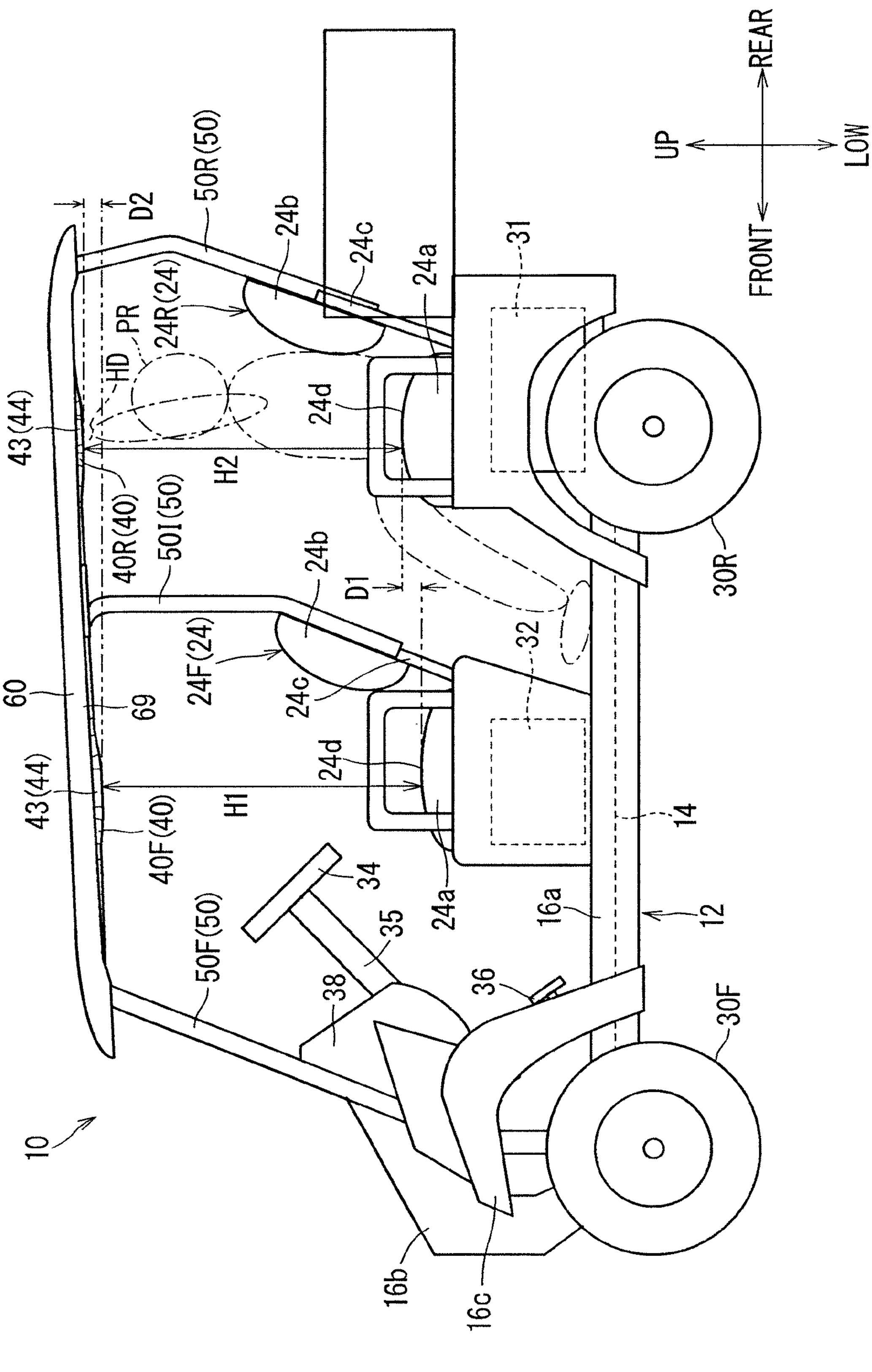
FIG. 1 is a side view illustrating a vehicle according to an embodiment.

A vehicle according to an embodiment will be hereinafter described. FIG. 1 is a side view illustrating a vehicle 10 according to the embodiment. In the following description, traveling directions of the vehicle 10 may be expressed as forward, backward opposite to the forward direction, downward toward road surfaces on which the vehicle 10 travels, and upward opposite to the downward direction. The right and left may be referred to while a person stands on a road surface and faces forward. The lateral direction is a vehicle-width direction.

The vehicle 10 may be a single-seater vehicle or a multi-seater vehicle. The vehicle 10 may have only a seat or seats in a forward and backward direction. Since the vehicle 10 is a vehicle designed to travel through, for example, private roads or private lands at low speeds, the vehicle 10 may have open right and left passenger entrances to seats without being obstructed by walls or doors to facilitate occupants PR getting on or off the vehicle 10. Here, the occupants PR can walk past in a lateral direction without being obstructed by doors or walls.

[Overall Structure of Vehicle]

The vehicle 10 includes seats 24 and poles 40. The vehicle 10 according to the embodiment further includes a vehicle body 12, a traveling mechanism, and a driving operation mechanism.

The vehicle body 12 may have a frame structure or a monocoque structure. This embodiment will be described assuming that the vehicle body 12 has a frame structure. The vehicle body 12 includes a frame 14 and panels. The frame 14 is structured by combining, for example, metallic pipe components, sheet metal components, or cast components. The panels cover the frame 14 and various components supported by the frame 14. The panels give the appearance of the vehicle 10, and partition spaces in the vehicle 10. Examples of the panels include a floor panel 16*a*, a hood 16*b*, and fenders 16*c*. The floor panel 16*a* is located at the bottom of the occupant space. A dashboard 38 is located more rearward than the hood 16*b*. The fenders 16*c* are located at both outside portions of the hood 16*b* in the lateral direction.

The seats 24 are parts on each of which the occupants PR are to be seated. The seats 24 are located on the floor panel 16*a*. The vehicle body 12 supports the seats 24. The seats 24 include a first seat 24F and a second seat 24R. The first seat 24F and the second seat 24R are separated from each other in the forward and backward direction. The first seat 24F includes a driver seat. The second seat 24R is located more rearward than the first seat 24F. Each of the seats 24 includes a seat cushion 24*a*, a back rest cushion 24*b*, and a seat frame 24*c*. The seat frames 24*c* can be considered as parts of the frame 14 in the vehicle body 12. Outside right and left portions of the seats 24 are openings through which the occupants PR get on and off the vehicle 10. The vehicle 10 is intended to normally travel with the openings being opened and not closed by, for example, doors.

Figure 3:
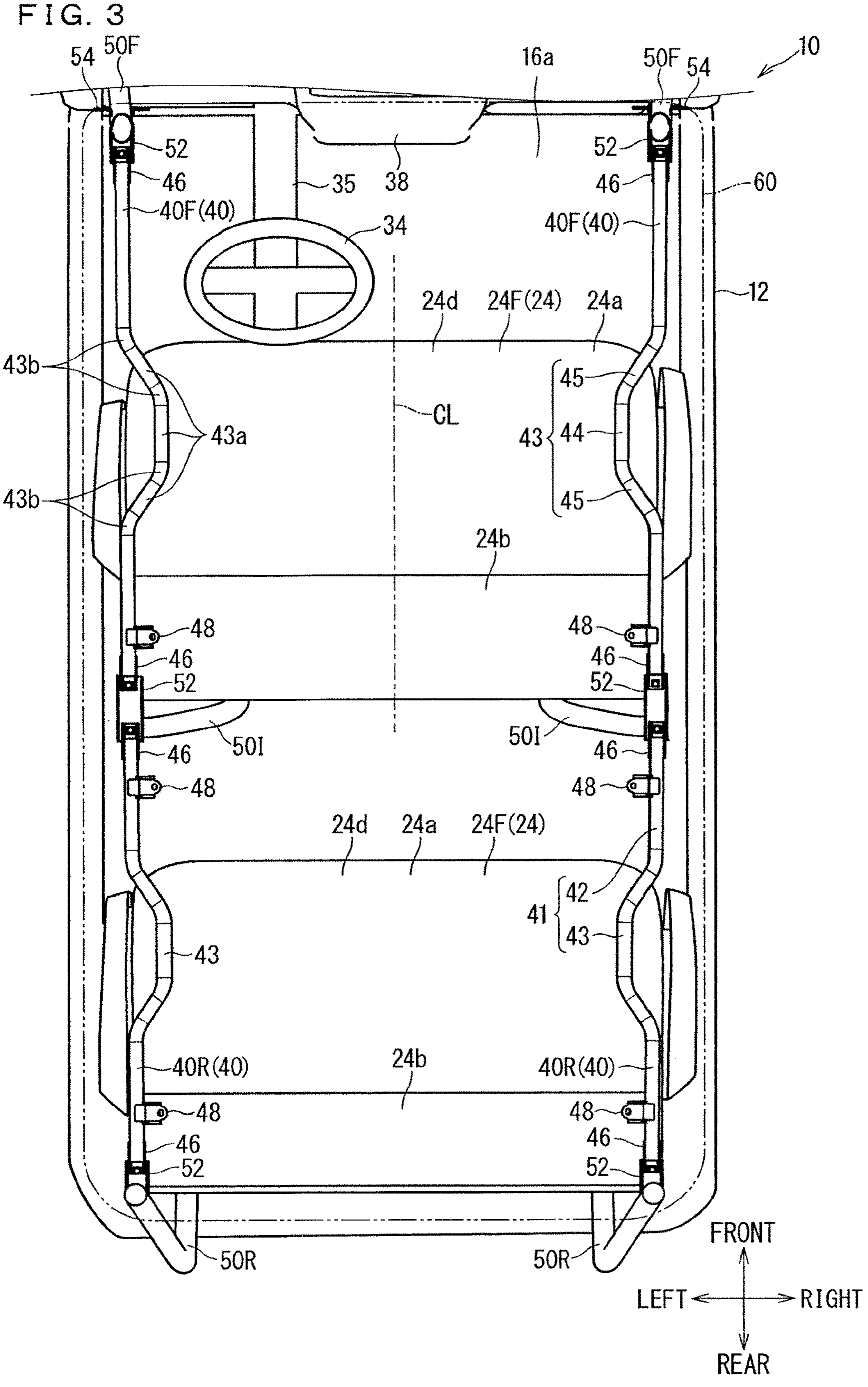
FIG. 3 is a plan view illustrating the vehicle in FIG. 1.

Each of the seats 24 according to this embodiment is a bench seat on which persons can be seated side by side in the vehicle-width direction. A driver seat on one side in the vehicle-width direction and an assistant driver seat on the other side in the vehicle-width direction are disposed to sandwich a middle in the vehicle-width direction. A center line CL in FIG. 3 is a line passing through the middle in the vehicle-width direction and extending in the forward and backward direction. Here, a portion of the seat 24 on one side with respect to the center line CL in the vehicle-width direction is considered as the driver seat, and a portion of the seat 24 on the other side is considered as the assistant driver seat. The seat 24 may have a structure in which the driver seat and the assistant driver seat are independently formed. Furthermore, the upper surface of the seat cushion 24*a* is a seat surface 24*d* of the seat 24.

The traveling mechanism is a mechanism for traveling of the vehicle 10, and includes wheels 30F and 30R, a traveling motor 31, and a power transmission mechanism. Transmission of rotation drive force of the traveling motor 31 to the wheels 30F and 30R through the power transmission mechanism allows the vehicle 10 to travel. This embodiment describes an example in which the vehicle 10 includes the four wheels 30F and 30R. The vehicle 10 may include three or six wheels. The structure of the power transmission mechanism is discretionary. Examples of the power transmission mechanism may include a transmission and a drive shaft.

The wheels 30F and 30R include front wheels 30F and rear wheels 30R, respectively. The two front wheels 30F are rotatable around its own central axis and are supported to be rotatable around a steering axis, at right and left front portions of the vehicle body 12. The two rear wheels 30R are supported to be rotatable around its own central axis at right and left rear portions of the vehicle body 12.

In this embodiment, the traveling motor 31 is an electric motor that converts electric energy into rotational motion for traveling. Here, the vehicle 10 includes a traveling battery 32 for supplying the electric energy to the traveling motor 31. For example, the traveling battery 32 is supported at a lower portion of the first seat 24F, and the traveling motor 31 is supported at a lower portion of the second seat 24R. The traveling motor 31 may be an internal combustion engine that burns fuel in a combustion chamber and generates power for traveling through expansion of gases from the burnt fuel. Here, the vehicle 10 should include a fuel tank. The positions of the traveling motor 31 and the traveling battery 32 are discretionary.

The driving operation mechanism is a mechanism for receiving a driving operation from the driver, and includes, for example, a steering wheel 34 and pedals 36. The operation of the steering wheel 34 by the driver enables the front wheels 30F to rotate around the steering axis. The driver can operate an accelerator and a brake through operations of the pedals 36. The steering wheel 34 and the pedals 36 are located more forward than the seats 24. The driver seated on the seat 24 can operate the steering wheel 34 and the pedals 36. For example, a steering column 35 protrudes rearward from the dashboard 38, and the steering wheel 34 is supported at the end of the steering column 35. The pedals 36 are located under the steering wheel 34. The pedals 36 may be an accelerator pedal and a brake pedal that are separately provided. One pedal may operate both of the accelerator and the brake.

Each of the poles 40 includes a rod 41 above the seat surfaces. Each of the rods 41 includes a main body 42 and a handle 43. The handle 43 extends from the main body 42 with bends. The occupants PR to be seated on each of the seats 24 can grasp the respective handles 43. Each of the poles 40 according to this embodiment is a roof pole for supporting a roof 60. The vehicle 10 according to this embodiment includes pillars 50 and the roof 60 that are separately provided from the poles 40. The pillars 50 support the poles 40. The poles 40 and the pillars 50 support the roof 60.

The roof 60 spreads above the first seat 24F and the second seat 24R to cover the first seat 24F and the second seat 24R from the top. The roof 60 can provide the occupants PR with a sunshade and a weather shield. The roof 60 according to this embodiment spreads from a position in front of the steering wheel 34 toward the rear of the back rest cushion 24*b* of the second seat 24R. The roof 60 spreads to cover the whole of the first seat 24F and the second seat 24R in the lateral direction.

The pillars 50 are portions extending upward above the seats 24 in the vehicle body 12. The pillars 50 increase the stiffness of the vehicle 10, and support the roof 60 and other components including a windshield in the vehicle 10. The pillars 50 according to this embodiment include front pillars 50F, intermediate pillars 501, and rear pillars 50R. The front pillars 50F, the intermediate pillars 501, and the rear pillars 50R may be referred to as A pillars, B pillars, and C pillars, respectively. The front pillars 50F extend upward from right and left portions which are more forward than the first seat 24F in the vehicle body 12. The intermediate pillars 50I extend upward from the seat frame 24*c* of the first seat 24F. The rear pillars 50R extend upward from the seat frame 24*c* of the second seat 24R. The intermediate pillars 501 and the rear pillars 50R may be supported by components except the seat frames 24*c*, for example, the floor.

The upper ends of the right and left pillars 50 may be coupled to each other. Specifically, the upper ends of the right and left front pillars 50F may be coupled to each other. The upper ends of the right and left intermediate pillars 50I may be coupled to each other. The upper ends of the right and left rear pillars 50R may be coupled to each other. The upper ends of the right and left pillars 50 need not be coupled to each other.

The upper ends of the front and rear pillars 50 may be coupled to each other. Specifically, the upper end of the front pillar 50F may be coupled to the upper end of the intermediate pillar 50I. The upper end of the intermediate pillar 50I may be coupled to the upper end of the rear pillar 50R. The upper ends of the front and rear pillars 50 need not be coupled to each other.

Figure 2:
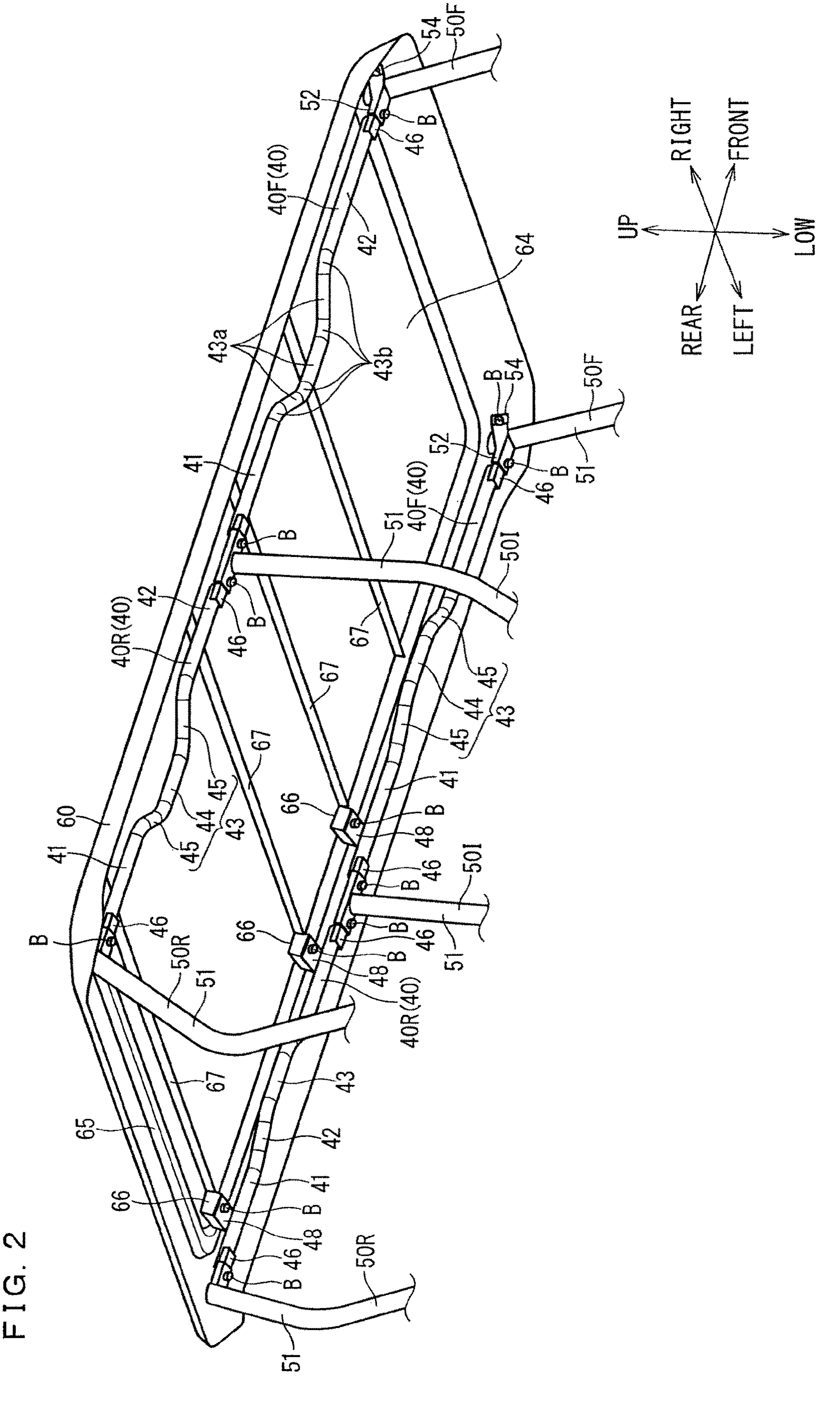
FIG. 2 is a perspective view illustrating an upper portion of the vehicle in FIG. 1.
Figure 4:
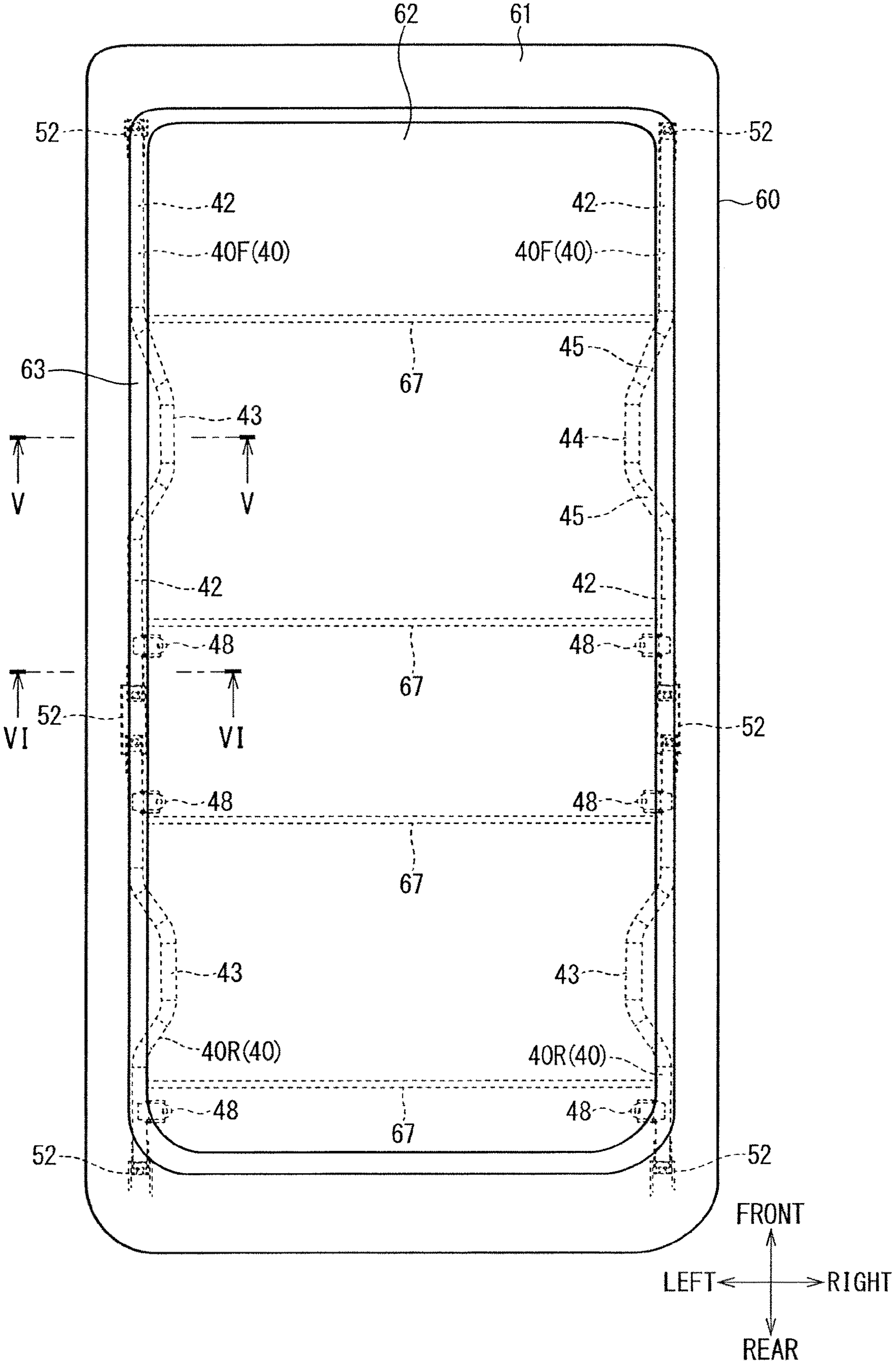
FIG. 4 is a plan view illustrating a roof.
Figure 5:
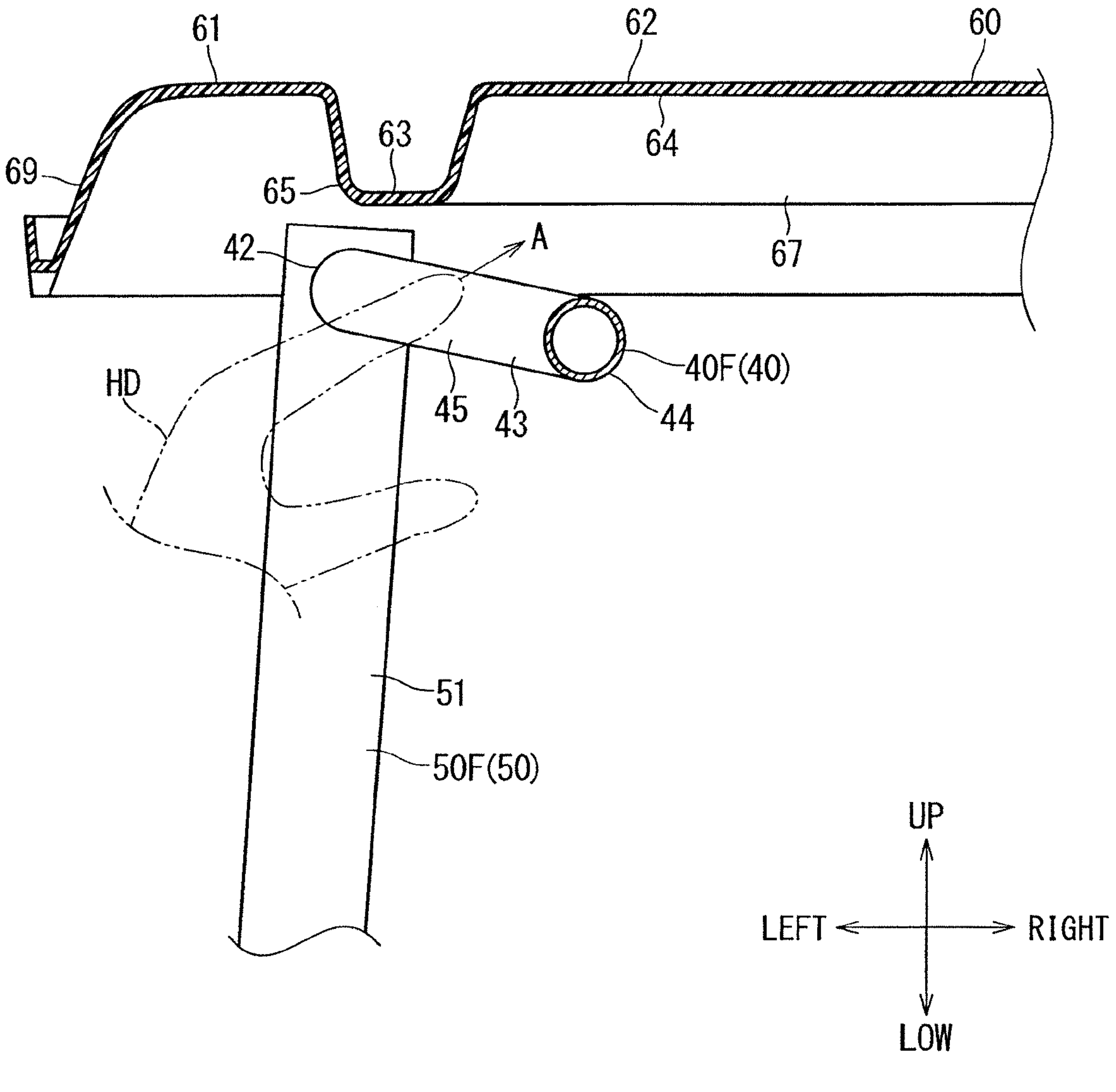
FIG. 5 illustrates a cross-sectional view taken along the line V-V of FIG. 4.
Figure 6:
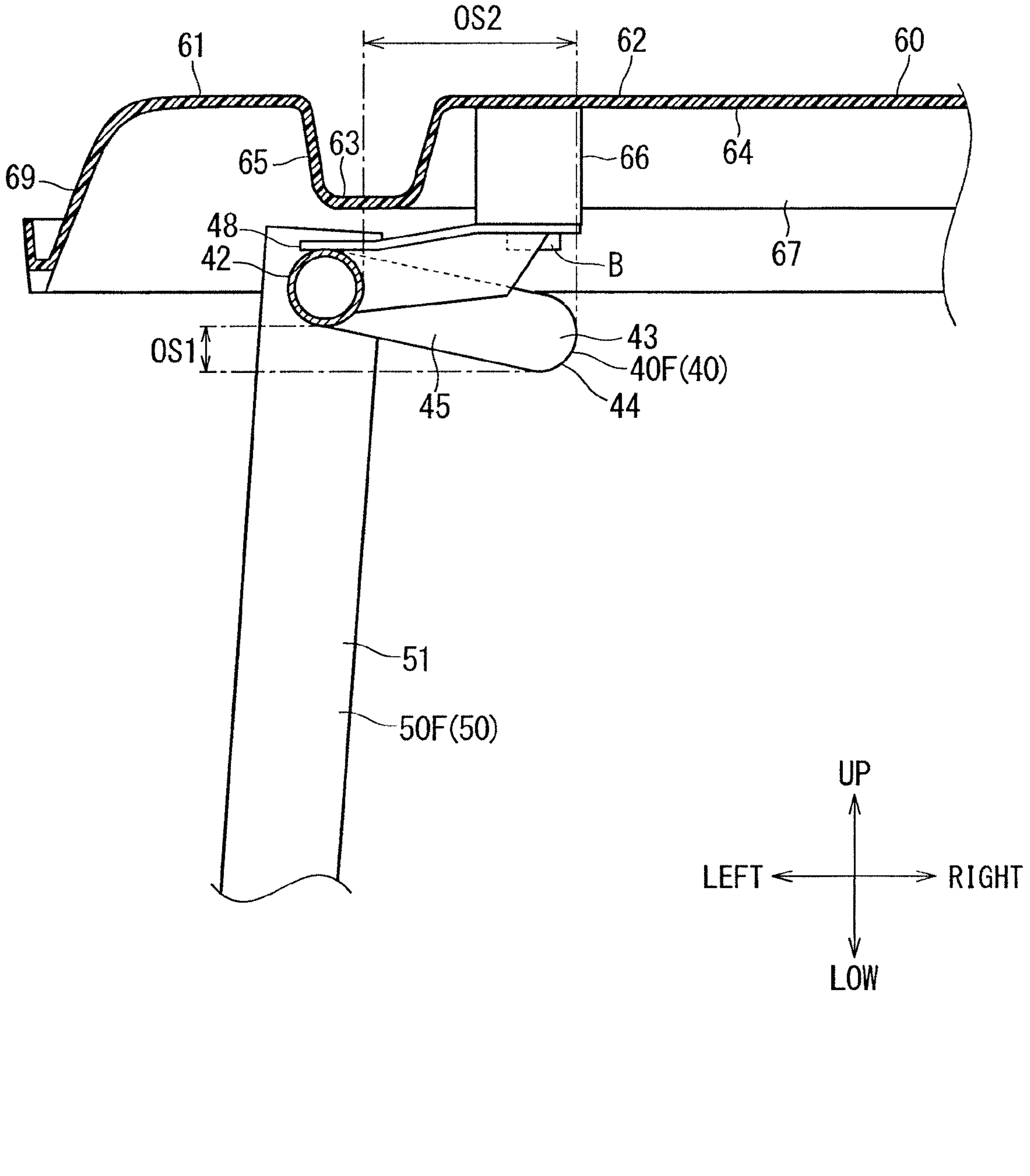
FIG. 6 illustrates a cross-sectional view taken along the line VI-VI of FIG. 4.

The poles 40, the pillars 50, and the roof 60 will be specifically described with reference to FIGS. 2 to 8. FIG. 2 is a perspective view illustrating the upper portion of the vehicle 10 in FIG. 1. FIG. 3 is a plan view illustrating the vehicle 10 in FIG. 1. In FIG. 3, the outer edge of the roof 60 is indicated by a virtual line. FIG. 4 is a plan view illustrating the roof 60. FIG. 5 illustrates a cross-sectional view taken along the line V-V of FIG. 4. FIG. 6 illustrates a cross-sectional view taken along the line VI-VI of FIG. 4. In FIGS. 5 and 6, the left on the plane of the paper is outside in the vehicle-width direction, and the right is inside in the vehicle-width direction.

The rods 41 of the poles 40 are pipes made of a metal or a resin. The rods 41 are components each obtained by bending a circular pipe. Each of the circular pipes is continuous with a uniform diameter.

The main body 42 extends in the forward and backward direction. The main bodies 42 are substantially parallel to each other in the forward and backward direction. The main bodies 42 are parallel to each other in the forward and backward direction, or cross in the forward and backward direction at an angle of 10 degree or less.

The handle 43 protrudes from the main body 42 in a direction orthogonal to the axial direction of the main body 42. The protruding direction of the handle 43 may be a vehicle-width direction, a vertical direction, or a direction intersecting with the vehicle-width direction and the vertical direction. Here, the handle 43 protrudes inward from the main body 42 in the vehicle-width direction. Furthermore, the handle 43 protrudes downward from the main body 42. Thus, the handle 43 protrudes downward from the main body 42 and inward in the vehicle-width direction. The handle 43 may be U-shaped. The surface of the handle 43 may be treated with a non-slip treatment. The non-slip treatment may be forming irregularities on the surface of the pipe. The irregularities on the surface of the pipe may be formed by, for example, embossing the surface. The non-slip treatment may be attaching, to the surface of the pipes, an elastic body less slippery than a pipe made of, for example, rubber or an elastomer.

Each of the handles 43 includes a separation portion 44 and connecting portions 45. The separation portion 44 is disposed in a middle portion of the main body 42 in the longitudinal direction, and extends from the main body 42 in a radial direction with space. The connecting portions 45 connect ends of the separation portion 44 to the main body 42. The connecting portions 45 are disposed at both ends of the separation portion 44. Consequently, u-shaping the handles 43 in a plan view can prevent a hand HD of the occupant PR from slipping in the longitudinal direction (the forward and backward direction) of the separation portion 44 while the occupant PR grasps the separation portion 44.

The separation portion 44 is substantially parallel to the main body 42. The separation portion 44 can be regarded as a portion obtained by offsetting the main body 42 downward and inward in the vehicle-width direction with the connecting portions 45. In FIG. 6, a dimension OS1 indicates an offset distance OS1 of the separation portion 44 in the vertical direction with respect to the main body 42. Furthermore, a dimension OS2 indicates an offset distance OS2 of the separation portion 44 in the vehicle-width direction with respect to the main body 42. The offsets OS1 and OS2 of each of the separation portions 44 with respect to the main body 42 in the respective directions can be, but not exclusively, appropriately set.

The offset distance OS1 in the vertical direction is smaller than the offset distance OS2 in the vehicle-width direction according to this embodiment. The offset distance OS1 in the vertical direction may be, for example, smaller than or equal to a diameter of the pipe forming each of the rods 41. The offset distance OS1 may be set so that the upper edge of the separation portion 44 is as high as a lower edge of a lateral portion of the roof 60. The offset distance OS2 in the vehicle-width direction may be, for example, larger than the diameter of the pipe forming each of the rods 41. The offset distance OS2 in the vehicle-width direction may be, for example, approximately double to five times the diameter of the pipe forming each of the rods 41. The offset distance OS2 may be set in the vehicle-width direction so that an outer edge of the separation portion 44 is located more inward than an inner edge of a ridge 65.

Each of the handles 43 includes straight portions 43*a* and curved portions 43*b*. Here, the separation portion 44 is one of the straight portions 43*a*. Furthermore, a middle portion between the connecting portions 45 is also the straight portion 43*a*. The curved portions 43*b* correspond to both ends of each of the connecting portions 45. The main bodies 42 are formed linearly, similarly to the straight portions 43*a*.

A pair of the poles 40 is disposed at each of right and left sides. The pairs of the poles 40 are disposed symmetric. Each of the pairs of the poles 40 includes the handles 43. Furthermore, the handles 43 are provided at positions corresponding to the first seat 24F and at positions corresponding to the second seat 24R. The positions corresponding to the seats may mean that, for example, at least a part of the handles 43 exists in the passenger space for the seats in the forward and backward direction. The passenger space may be an area that is a combination of seat areas for the seats, and footrest areas in front of the seat areas. The positions corresponding to the seats may mean that, for example, at least a part of the handles 43 exists in the seat area in the forward and backward direction.

As illustrated in FIG. 3, the handles are provided in an area between the front end and the rear end of each of the seat surfaces 24*d* in the forward and backward direction. Disposing the handles 43 between the front end and the rear end of each of the seat surfaces 24*d* may mean that an area between the front end and the rear end of each of the seat surfaces 24*d* includes at least a part of the handles 43. Here, the areas each between the front end and the rear end of the seat surface 24*d* include half the handles 43 or more. Here, the areas each between the front end and the rear end of the seat surface 24*d* include all the separation portions 44.

The poles 40 according to this embodiment are divided in the forward and backward direction. Each of the poles 40 includes a first pole 40F with the handle 43 for the first seat 24F, and a second pole 40R with the handle 43 for the second seat 24R.

In FIG. 1, a dimension D1 indicates a difference in height between the seat surface of the second seat 24R and the seat surface of the first seat 24F. Furthermore, a dimension D2 indicates a difference in height between the handle 43 for the second seat 24R and the handle 43 for the first seat 24F. Furthermore, a dimension H1 indicates a distance from the seat surface of the first seat 24F to the handle 43 for the first seat 24F. A dimension H2 indicates a distance from the seat surface of the second seat 24R to the handle 43 for the second seat 24R.

As illustrated in FIG. 1, the seat surface 24*d* of the second seat 24R is higher than the seat surface 24*d* of the first seat 24F. Furthermore, the handle 43 for the second seat 24R is higher than the handle 43 for the first seat 24F. The dimensions D1 and D2 can be, but not exclusively, appropriately set. For example, the dimension D1 may be larger or smaller than the dimension D2. For example, the dimension D1 may be equal to the dimension D2. When the dimension D1 is equal to the dimension D2, the dimension H1 is equal to the dimension H2.

Here, the roof 60 is supported to be lowered forward where a front portion thereof falls with respect to a rear portion thereof. The first poles 40F and the second poles 40R are supported to be lowered forward similarly to the roof 60.

The roof 60 includes a roof body 61. The roof body 61 is formed into, for example, a rectangular plate in a plan view. The roof body 61 has an upper surface 62 and a lower surface 64. A gutter 63 is formed on the upper surface 62 of the roof 60. The shape of the gutter 63 according to this embodiment is, but not exclusively, formed into a rectangle in a plan view similarly to the roof body 61.

The ridge 65 is formed on the lower surface of the roof 60 in a portion corresponding to the gutter 63. As illustrated in FIG. 5, the separation portion 44 of the handle 43 protrudes inward from the ridge 65 in the vehicle-width direction. There is space between the separation portion 44 and the ridge 65 into which the hand HD of the occupant PR can be inserted. Insertion of the hand HD into the space in a direction of an arrow sign A in FIG. 5 allows the occupant PR to grasp the separation portion 44.

As illustrated in FIG. 6, a portion continuous to the handle 43 in the pole 40 (the main body 42 herein) is located under the ridge 65. The space between the main body 42 and the ridge 65 is smaller than that between the separation portion 44 and the ridge 65. The space between the main body 42 and the ridge 65 is space into which the occupant PR cannot insert the hand HD.

As illustrated in FIG. 1, at least parts of the handles 43 are exposed from the remaining portions of the vehicle 10 in a side view of the vehicle 10. The separation portions 44 of the handles 43 fall with respect to the lower edge of the roof 60 and the remaining portions of the poles 40.

As illustrated in FIG. 5, the roof body 61 has, for example, a shape with an outer edge 69 falling with respect to a middle portion thereof. The handle 43 is located under the outer edge 69 located at a position identical to that of the handle 43 in the forward and backward direction. As illustrated in FIG. 1, a lower edge of the outer edge 69 in the middle along the forward and backward direction may be higher than a line connecting lower edges of both ends of the outer edge 69 along the forward and backward direction. This facilitates exposure of the handles 43 in a side view.

As illustrated in FIG. 5, a rib 67 extending in the vehicle-width direction may be disposed on the lower surface 64 of the roof 60. The rib 67 may connect the left ridge 65 to the right ridge 65. The rib 67 increases the stiffness of the roof 60.

As illustrated in FIG. 4, the ribs 67 may be disposed at several positions in the forward and backward direction. Each of the ribs 67 should be disposed at a position away from the handle 43 in the forward and backward direction. Here, the ribs 67 are disposed in the forward and backward direction at both sides of the two handles 43 disposed away in the forward and backward direction.

The lower surface 64 of the roof 60 includes a facing portion facing the handles 43 from above the handles 43, and a surrounding portion that is a portion around the facing portion and protrudes downward from the facing portion. Here, the surrounding portion includes portions of the ridge 65 located at lateral sides of the handles 43. The surrounding portion also includes end portions of the ribs 67 in the vehicle-width direction.

The pillars 50 are disposed side by side in the forward and backward direction. The main body 42 is connected to the upper ends of the two pillars 50 aligned in the forward and backward direction. This allows the poles 40 to be support by the pillars 50, can increase the support stiffness of the pillars 50 for supporting the poles 40, and can prevent displacement of the handles 43 with respect to the vehicle body 12. In this embodiment, the front pillars 50F and the intermediate pillars 50I support the main bodies 42 of the first poles 40F. Furthermore, the intermediate pillars 50I and the rear pillars 50R support the main bodies 42 of the second poles 40R.

The handle 43 is located between the two pillars 50 aligned in the forward and backward direction. This can locate the handle 43 at a position away from the pillars 50, and facilitates locating the handle 43 closer to the seat surface 24*d*. In this embodiment, the handles 43 of the first poles 40F are disposed between the front pillars 50F and the intermediate pillars 50I. Furthermore, the handles 43 of the second poles 40R are disposed between the intermediate pillars 50I and the rear pillars 50R.

[Connecting Poles and Pillars]

Figure 7:
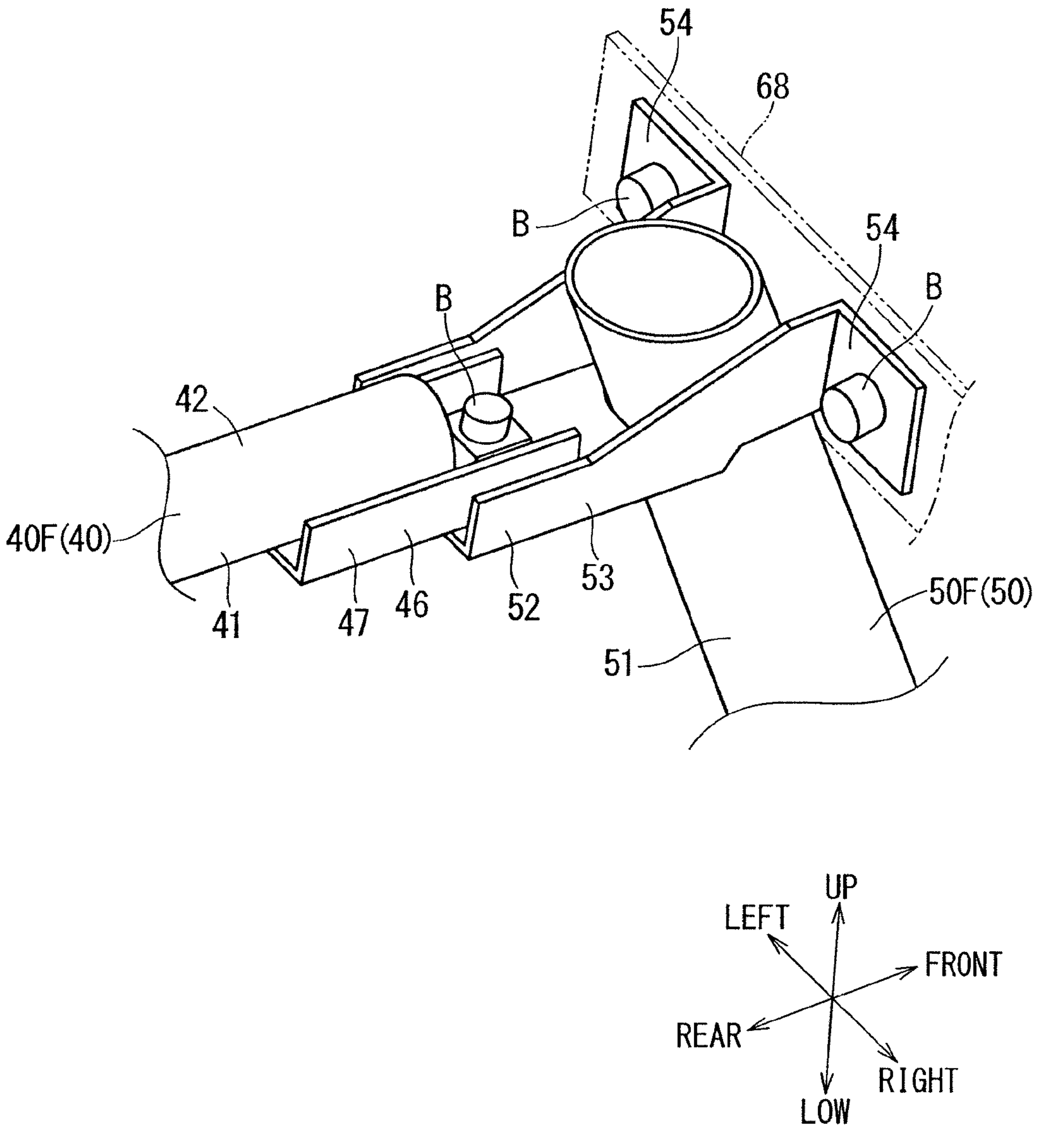
FIG. 7 is a perspective view illustrating a connection portion between a pole and a front pillar.
Figure 8:
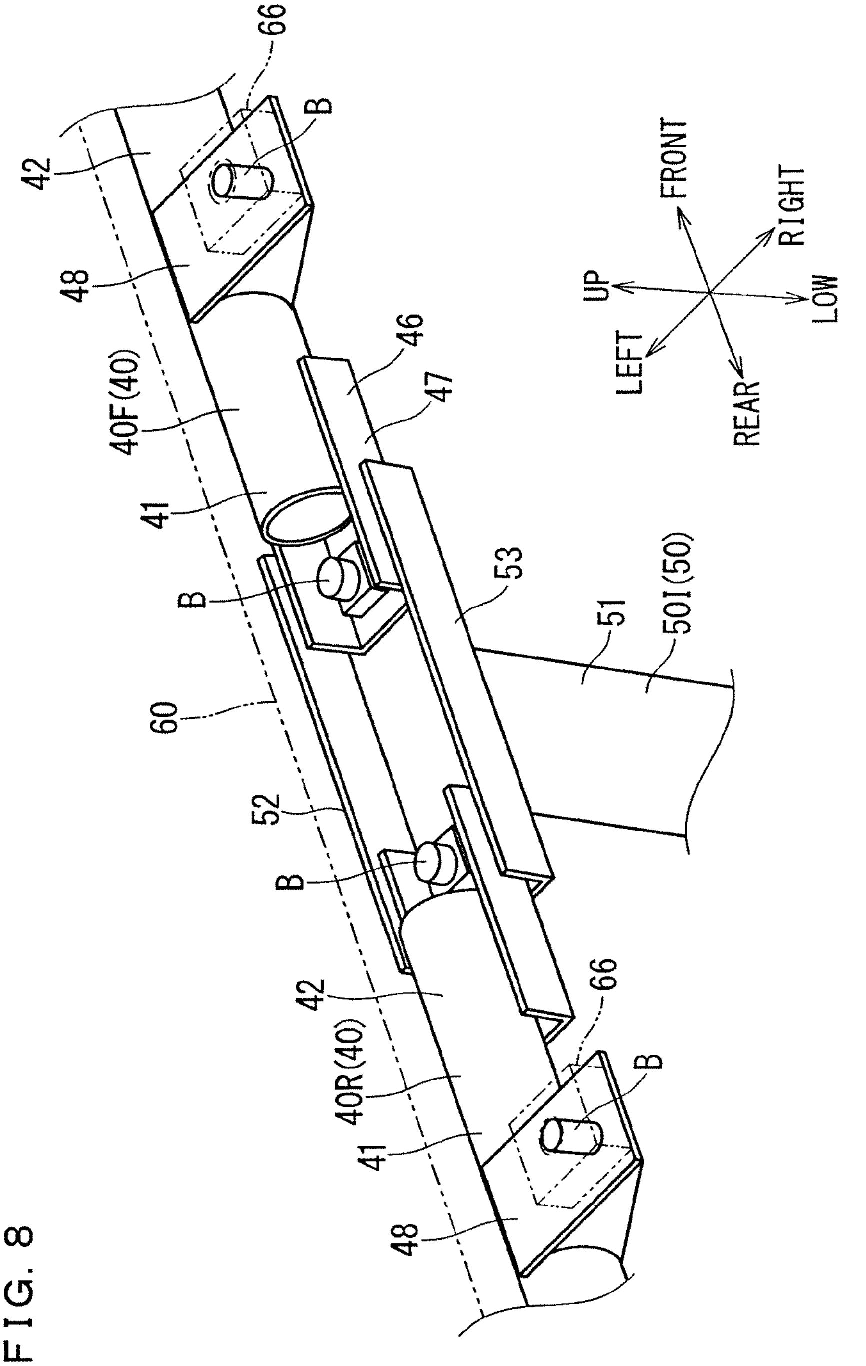
FIG. 8 is a perspective view illustrating a connection portion between poles and an intermediate pillar.

FIG. 7 is a perspective view illustrating a connection portion between the first pole 40F and the front pillar 50F. FIG. 8 is a perspective view illustrating a connection portion between the poles 40 and the intermediate pillar 50I.

Each of the poles 40 includes a pillar connector 46 as a vehicle body connector. The pillar connector 46 protrudes from the main body 42. The pillar connectors 46 protrude from both ends of the main body 42 along the axial direction. The pillar connector 46 according to this embodiment includes a bracket 47 disposed separately from the pipe forming each of the rods 41. The bracket 47 is formed into a shape with a bottom and a pair of side walls. The bracket 47 is made of, for example, a metal or a resin. A portion enclosed by the bottom and the pair of side walls forms a groove. An end of the rod 41 is disposed at one end of the groove. The bracket 47 is fixed to the rod 41 by, for example, welding.

Each of the pillars 50 includes a pillar body 51 and a pole connector 52. For example, the pillar body 51 includes a pipe, and the pole connector 52 includes a bracket 53. The pipe and the bracket 53 are made of a metal or a resin. The pillar body 51 mainly extends along the vertical direction. The pole connector 52 protrudes from the pillar body 51 in a direction intersecting with the axial direction. The pole connector 52 according to this embodiment protrudes from the pillar body 51 in the forward and backward direction. In this embodiment, the pipe forming the rod 41 is thinner than the pipe forming the pillar body 51. This facilitates bending the rod 41 including the handle 43. Furthermore, this makes the handle 43 thinner than the pillar body 51, so that the occupant PR can easily grasp the handle 43. The fact that the handle 43 is thinner than the pillar body 51 may mean that an outer cross-sectional area of the handle 43 is smaller than that of the pillar body 51. The pipe forming the rod 41 may be as thick as or thicker than the pipe forming the pillar body 51.

The bracket 53 included in the pole connector 52 is formed into a shape with a bottom and a pair of side walls. A portion enclosed by the bottom and the pair of side walls forms the gutter 63. The end of the pole 40 along the axial direction (the pillar connector 46 herein) is connected to the pole connector 52. The end of the main body 42 of the pole 40 is connected to the upper end of the pillar 50 through the pillar connector 46, and extends in the forward and backward direction. In this embodiment, the bracket 47 at the front end of the first pole 40F is connected to the bracket 53 at the upper end of the front pillar 50F. The bracket 47 at the rear end of the first pole 40F and the bracket 47 at the front end of the second pole 40R are connected to the bracket 53 at the upper end of the intermediate pillar 50I. The bracket 47 at the rear end of the second pole 40R is connected to the bracket 53 of the rear pillar 50R.

Of the ends of the brackets 47 of the pillar connectors 46, the end on which the rod 41 is not disposed fits into the end of the groove of the bracket 53 of the pole connector 52. The grooves on the brackets 47 of the pillar connectors 46 and the grooves on the brackets 53 of the pole connectors 52 have openings facing upward. The pillar connector 46 is fixed to the pole connector 52 by tightening a tightening component B such as a bolt B. Through holes through each of which the tightening component B passes are formed on the pillar connector 46 and the pole connector 52. One of the through holes on the pillar connector 46 and the pole connector 52 may be formed into a long hole in an extension direction of the groove on the bracket. The tightening component B penetrates an overlapping portion of the bottoms of the brackets 47 and 53. The head of the bolt B may be lower or higher than the bottoms of the brackets 47 and 53.

As illustrated in FIG. 7, the upper end of the pillar body 51 penetrates a front portion of the bottom of the bracket 53 in the front pillar 50F. The side walls of the bracket 53 extend to the outer surface of the pillar body 51 of the front pillar 50F. For example, the side walls of the bracket 53 are welded to the pillar body 51 of the front pillar 50F.

As illustrated in FIG. 8, the bracket 53 is disposed on the upper end of the pillar body 51 in the intermediate pillar 50I. The pillar body 51 of the intermediate pillar 50I does not penetrate the bracket 53. For example, an end face of the pillar body 51 of the intermediate pillar 50I is welded to a bottom surface of the bottom of the bracket 53.

A coupling portion for coupling the first pole 40F to the second pole 40R is provided. The coupling via the coupling portion coaxially forms the main body 42 of the first pole 40F and the main body 42 of the second pole 40R. Here, the pole connector 52 at the end of the intermediate pillar 50I is the coupling portion for coupling the first pole 40F to the second pole 40R.

In the rear pillar 50R, the bracket 53 is fixed to the pillar body 51 in the same manner as the front pillar 50F. In the rear pillar 50R, the bracket 53 may be fixed to the pillar body 51 in the same manner as the intermediate pillar 50I.

As illustrated in FIG. 7, the upper end of the front pillar 50F may extend higher than the bracket 53. The upper end of the front pillar 50F may be connected to the bottom of the gutter 63 of the roof 60, and used as a drainage pathway for water accumulated in the gutter 63 of the roof 60. The upper ends of the two front pillars 50F may be connected to, for example, two front corners of the gutter 63 of the roof 60 that is rectangular in a plan view.

The pole connector 52 of the pillar 50 according to this embodiment can temporarily support the pole 40 without tightening the bolt B. Consequently, the operator need not support the pole 40 while performing an operation of tightening the bolt B. Here, the bracket 53 of the pole connector 52 supports the bracket 47 of the pillar connector 46 from the bottom. Here, the bracket 47 of the pillar connector 46 engages in the groove of the bracket 53 of the pole connector 52. This prevents the pole 40 from disengaging from the groove of the bracket 53 in the vehicle-width direction. These facilitate an operation of fastening the pole 40.

[Connecting Roof]

The roof 60 according to this embodiment is connected to both of the pillars 50 and the poles 40. The roof 60 may be connected to only one of the pillars 50 and the poles 40.

As illustrated in FIG. 7, the front pillar 50F includes roof connectors 54. The roof connectors 54 are integrated into the bracket 53 of the pole connector 52. The side walls of the bracket 53 according to this embodiment protrude more forward than the pillar body 51 of the front pillar 50F. The roof connectors 54 are portions protruding from the front edges of the side walls toward both sides along the vehicle-width direction.

The roof 60 includes a pillar connector 68 connected to the roof connectors 54 of each of the pillars 50. The pillar connector 68, for example, protrudes downward from the lower surface 64 at a portion slightly behind the front edge of the roof 60. The pillar connector 68 may be disposed on, for example, an inner surface of the outer edge 69 sagging at a front end of the roof 60. The roof connectors 54 are fastened to the pillar connector 68, for example, through the tightening components B such as the bolts B. The tightening components B are tightened, for example, in the forward and backward direction. Here, the tightening components B are tightened from behind in the forward and backward direction.

As illustrated in FIG. 8, each of the poles 40 includes the roof connector 48. Each of the roof connectors 48 protrudes from the main body 42. Each of the roof connectors 48 according to this embodiment protrudes inward from the main body 42 in the vehicle-width direction. The roof connector 48 includes a bracket. The bracket of the roof connector 48 is connected to the pipe forming the rod 41 by, for example, welding. The bracket of the roof connector 48 includes a main plate horizontally spreading. The tightening component B is fastened to the main plate.

The roof 60 includes pole connectors 66 each connected to the roof connector 48 of the pole 40. As illustrated in FIG. 6, the pole connector 66 protrudes downward from the lower surface 64 of the roof 60. The roof connector 48 is connected to the pole connector 66, for example, by tightening the tightening component B such as the bolt B. The tightening component B for fastening the roof connector 48 to the pole connector 66 is tightened, for example, in the vertical direction. Here, the tightening component B for fastening the roof connector 48 to the pole connector 66 is tightened from below in the vertical direction. The rib 67 may be disposed at the pole connector 66. The rib 67 may connect the right and left pole connectors 66.

The position of the roof connector 48 in the pole 40 in the forward and backward direction can be, but not exclusively, appropriately set. Here, the roof connectors 48 are disposed at three portions in each of the right and left poles 40, that is, at the rear end of the first pole 40F, and the front end and the rear end of the second pole 40R. The roof connector 48 protrudes from a portion between the handle 43 in the main body 42 and the pillar connector 46, in a direction intersecting with the axial direction. The front end of the roof 60 is connected to the roof connectors 54 of the pillars 50. Here, connection of the roof connectors 54 of the pillars 50 to the pillar connectors 68 at the front end of the roof 60 can cause the roof connectors 48 of the poles 40 to be positioned in the positions of the pole connectors 66 of the roof 60. The front end of the roof 60 may be connected not to the roof connectors 54 of the pillars 50 but to the roof connectors 48 of the poles 40. Furthermore, the rear pillars 50R may include the roof connectors 54, and the rear end of the roof 60 may be connected not to the roof connectors 48 at the rear ends of the second poles 40R but to the roof connectors 54 of the rear pillars 50R.

The vehicle body 12 (the pillars 50 herein) supports both ends of the poles 40. The roof connectors 48 closer to the middle than to both ends of the poles 40 are in supporting relation to the roof 60. A portion of the first pole 40F including the handle 43 between the pillar connector 46 for the front pillar 50F and the roof connector 48 is suspended in air without being supported by the vehicle body 12. Similarly, a portion of the second pole 40R including the handle 43 between the two roof connectors 48 is suspended in air without being supported by the vehicle body 12. For example, the thickness of the pipe forming the rod 41 is set to have a stiffness for withstanding a certain load from the occupant PR when the occupant PR grasps the handle 43 suspended in air.

Advantages

In the vehicle 10 with the aforementioned structure, integration of the handles 43 with the poles 40 can prevent an increase in the number of components and easily provide the handles 43.

Furthermore, the main body 42 is connected to an upper end of each of the pillars 50 and extends in the forward and backward direction. This integrates the handle 43 with the pole 40 supported on the pillar 50. This can locate the handle 43 at a position relatively higher than that located in the pillar 50, and can prevent the handle 43 from becoming an obstacle when the occupant PR gets on and off the vehicle 10.

Furthermore, the handle 43 protrudes from the main body 42 in the vehicle-width direction. This hardly narrows the vertical space in the occupant space when compared to the handle 43 protruding vertically downward from the main body 42.

Furthermore, the handle 43 protrudes inward from the main body 42 in the vehicle-width direction. This can prevent the handle 43 from protruding outward from the vehicle 10. Locating the handle 43 closer to the seat surface 24*d* enables the occupant PR to easily grasp the handle 43.

Furthermore, the handle 43 protrudes downward from the main body 42 and inward in the vehicle-width direction. This facilitates visually recognizing the handle 43 from outside of the vehicle 10.

Furthermore, the vehicle 10 includes the roof 60 supported by the poles 40. Consequently, the handles 43 are provided in the poles 40 supporting the roof 60.

Furthermore, the vehicle 10 includes the roof 60 supported by the main bodies 42, wherein the handle 43 protrudes inward from each of the main bodies 42 in the vehicle-width direction. This can locate a portion supporting the roof 60 outside in the vehicle-width direction, increases the support stiffness for supporting the roof 60, and easily forms the handles 43.

Furthermore, the lower surface 64 of the roof 60 includes a facing portion facing the handles 43 from above the handles 43, and a surrounding portion that is a portion around the facing portion and protrudes downward from the facing portion. This hardly causes an interference between the hand HD of the occupant PR and the roof 60 when the occupant PR grasps the handle 43.

Furthermore, a portion continuous to the handle 43 in each of the poles 40 is located under the ridge 65, and the handle 43 protrudes inward from the ridge 65 in the vehicle-width direction. Since the handle 43 is located away from the ridge 65, this hardly causes an interference between the hand HD of the occupant PR and the roof 60 when the occupant PR grasps the handle 43.

Furthermore, the handles 43 are provided in an area between a front end and a rear end of each of the seat surfaces **24*d* in the forward and backward direction. Consequently, the handle 43 is easily accessible to the occupant PR while clearing the passage in the vehicle 10**.

Furthermore, the handles 43 are thinner than the pillars 50. This allows the handle 43 to be easily grasped while the support stiffness of the pillars 50 is maintained.

Furthermore, at least parts of the handles 43 are exposed from remaining portions of the vehicle 10 in a side view of the vehicle 10. This facilitates visually recognizing the handle 43 when the occupant PR gets on the vehicle 10 from outside.

Furthermore, the seats 24 include the first seat 24F including a driver seat, and the handles 43 are provided at positions corresponding to the first seat 24F. Consequently, the handle 43 is easily accessible to the occupant PR on the first seat 24F. Furthermore, the seats 24 include the first seat 24F including a driver seat, and the second seat 24R behind the first seat 24F, and the handles 43 are provided at positions corresponding to the second seat 24R. Consequently, the handle 43 is easily accessible to the occupant PR on the second seat 24R. Here, since the handles 43 are provided at corresponding positions of the first seat 24F and the second seat 24R, the handles 43 are easily accessible to the occupants PR on the first seat 24F and the second seat 24R.

Furthermore, each of the poles 40 includes the first pole 40F with the handle 43 for the first seat 24F, and the second pole 40R with the handle 43 for the second seat 24R, the second pole 40R being provided separately from the first pole 40F. This can shorten the first pole 40F and the second pole 40R and facilitates manufacturing of the poles 40 each including the handle 43, more than those when one pole includes the handle 43 for the first seat 24F and the handle 43 for the second seat 24R.

Furthermore, the seat surface **24*d* of the second seat 24R is higher than the seat surface 24*d* of the first seat 24F, and the handle 43 for the second seat 24R is higher than the handle 43 for the first seat 24F. Consequently, the handles 43 are easily accessible to the occupants PR on the first seat 24F and the second seat 24**R.

Furthermore, each of the rods 41 is a component obtained by bending a circular pipe. This facilitates manufacturing of the poles 40 each including the handle 43.

Furthermore, each of the handles 43 includes the straight portions **43*a* and the curved portions 43*b*. The straight portions 43*a* facilitate manufacturing of the poles 40 each including the handle 43 more than those when the handle 43 only consists of the curved portions 43*b***.

Other Modifications

Figure 9:
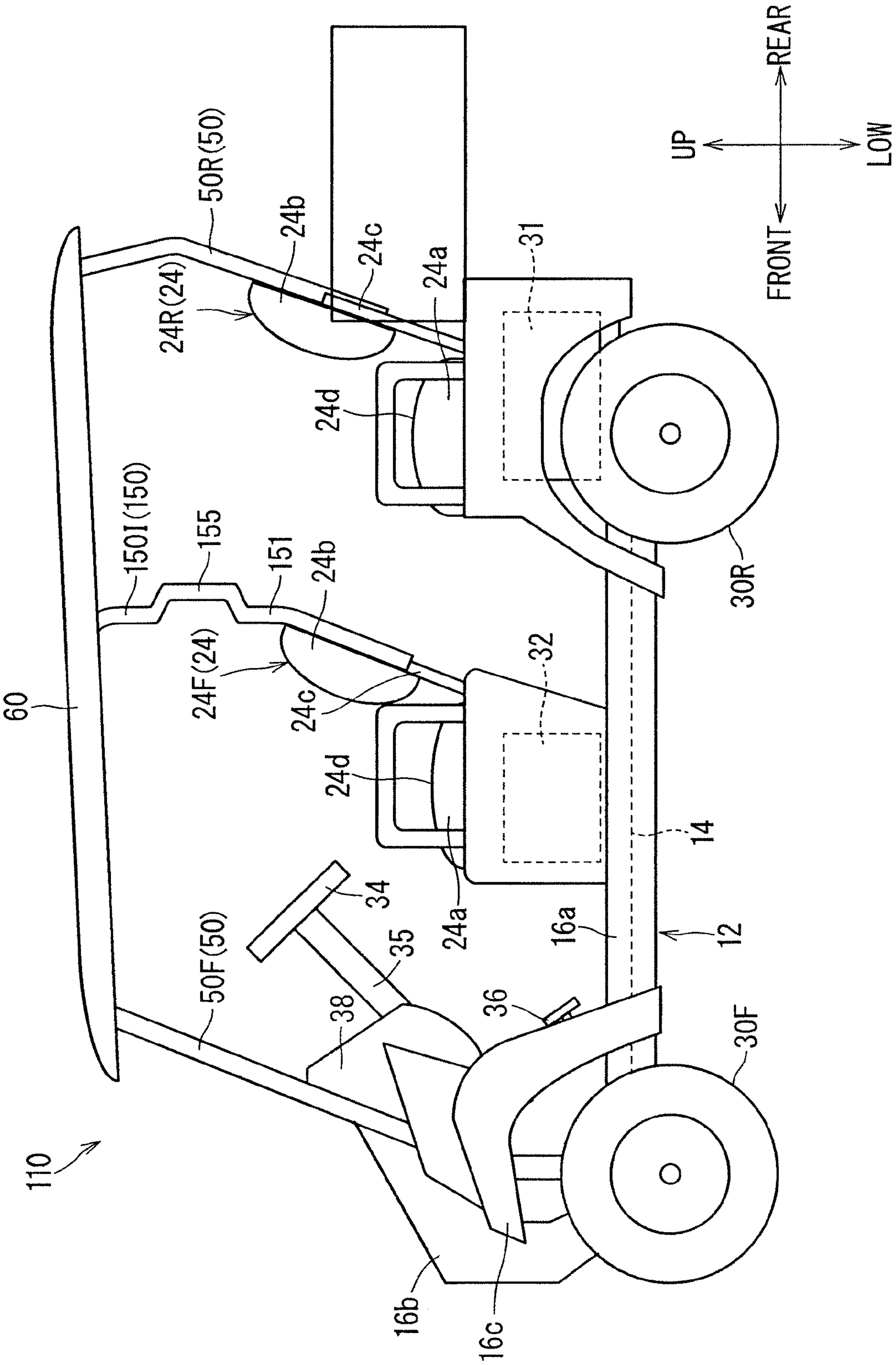
FIG. 9 is a side view illustrating a vehicle according to another modification.

FIG. 9 is a side view illustrating a vehicle 110 according to another modification. Although each of the roof poles 40 includes the handles 43 in the aforementioned description, this structure is not essential. As illustrated in the vehicle 110 in FIG. 9, a pillar 150 may include a handle 155. Specifically, the vehicle 110 includes a frame body that supports the seat surfaces **24*d*. A pole including a main body 151 and the handle 155 is used as the pillar 150 extending upward from the frame body. Consequently, a part of the pillar 150 can be used as the handle 155**.

In the example of FIG. 9, an intermediate pillar 1501 extending upward from the seat frame **24*c* for the first seat 24F includes the handle 155. The front pillar 50F or the rear pillar 50**R may include a handle. When a handle is provided in pillars, at least one of the pillars should include the handle.

Although the embodiment describes that the vehicle 10 includes the first seat 24F and the second seat 24R, this structure is not essential. The vehicle may include only the first seat 24F without the second seat 24R. The vehicle may further include a seat more rearward than the second seat 24R.

Although the embodiment describes that the vehicle 10 does not include doors at both sides of the seats 24, this structure is not essential. The vehicle may include doors at both sides of the seats 24.

The vehicle 10 may include or need not include a roof.

Although the embodiment describes that the vehicle 10 includes the pillars 50, this structure is not essential. The vehicle may include a rollover protective structure (ROPS) for defining a riding space, instead of the pillars 50.

Although the embodiment describes that the driver drives the vehicle 10, this structure is not essential. The vehicle may be an automated driving vehicle. The vehicle may be configured to switch between an automated driving mode and a mode in which the driver drives the vehicle.

Although the embodiment describes that the vehicle 10 travels within a limited area, this structure is not essential. The vehicle 10 may be a vehicle that can travel through public roads.

Although the seats 24 include the first seat 24F and the second seat 24R for both of which the handles 43 are provided in the description, this structure is not essential. For example, the seats 24 may include the first seat 24F and the second seat 24R for only one of which the handles 43 may be provided. For example, the seats 24 may include only the first seat 24F, and the second seat 24R and the handles for the second seat 24R may be omitted.

Although a pair of the handles 43 is provided at each of right and left sides in the aforementioned description, this structure is not essential. A pair of the handles 43 may be provided at only one of the right and left sides. For example, the handle 43 may be provided only for the assistant driver seat, not for the driver seat in the seat 24.

Although the roof pole 40 is described as having a front-rear split construction with the poles 40F and 40R, this structure is not essential. The roof pole may have a front-rear unitary construction so that one roof pole includes both of the poles 40F and 40R.

The vehicle 10 may be a passenger transport vehicle. The passenger transport vehicle is a vehicle designed to travel at low speeds within a limited area. Examples of the limited area include limited community areas, and private roads and private lands (e.g., golf courses and parks) except public roads. The limited community areas may be areas provided for use by community residents. The community areas are, for example, areas including houses and public facilities (e.g., schools and hospitals), and are areas in which the passenger transport vehicle designed to travel through non-public highways is permitted to travel at low speeds. The low speeds are, for example, speeds with upper limits ranging from 20 mph to 30 mph. The passenger transport vehicles include personal transport vehicles (PTVs) in accordance with ANSI/ILTVA Z135, and golf carts in accordance with ANSI/ILTVA Z130.1. Furthermore, the passenger transport vehicles include personal transportation electric vehicles.

Passenger transport vehicles may be, for example, versatile small vehicles suitable for traveling through limited off-road areas rather than traveling through public roads at fast speeds. Off-road vehicles may be, for example, side-by-side vehicles. The side-by-side vehicles are, for example, small vehicles suitable for all terrain travel, particularly, off-road travel, and vehicles in which occupants can be seated side by side. The side-by-side vehicles may be, for example, multipurpose off-highway utility vehicles (MOHUVs) defined by ANSI/OPEI B71.9-2016, and recreational off-highway vehicles defined by ANSI/ROHVA 1-2016.

The structures described in the embodiment and the modifications can be appropriately combined unless any contradiction occurs.

APPENDIXES

This application discloses the following aspects.

A first aspect is a vehicle comprising: at least one seat including a seat surface; and at least one pole including a rod higher than the seat surface, the rod including a main body and a handle extending from the main body with bends so that an occupant to be seated on the at least one seat can grasp the handle.

In this vehicle, integration of the handles with the poles can prevent an increase in the number of components and easily provide the handles.

A second aspect is the vehicle according to the first aspect comprising a pillar, wherein the main body is connected to an upper end of the pillar and extends in a forward and backward direction.

This integrates the handle with the pole supported on the pillar. This can locate the handle at a position relatively higher than that located in the pillar, and can prevent the handle from becoming an obstacle when the occupant gets on and off the vehicle.

A third aspect is the vehicle according to the second aspect, wherein the handle protrudes from the main body in a direction orthogonal to an axial direction of the main body.

This hardly narrows the vertical space in the occupant space when compared to the handle protruding vertically downward from the main body.

A fourth aspect is the vehicle according to the second aspect, wherein the handle protrudes inward from the main body in a vehicle-width direction.

This can prevent the handle from protruding outward from the vehicle. Locating the handle closer to the seat surface enables the occupant to easily grasp the handle.

A fifth aspect is the vehicle according to the second aspect, wherein the handle protrudes downward from the main body and inward in a vehicle-width direction.

This facilitates visually recognizing a handle portion from outside of the vehicle.

A sixth aspect is the vehicle according to the second aspect comprising a roof supported by the at least one pole.

Consequently, the handles are provided in the poles supporting the roof.

A seventh aspect is the vehicle according to the second aspect comprising a roof supported by the main body, wherein the handle protrudes inward from the main body in a vehicle-width direction.

This can locate a portion supporting the roof outside in the vehicle-width direction, increases the stiffness for supporting the roof, and easily forms the handles.

An eighth aspect is the vehicle according to the sixth aspect, wherein a lower surface of the roof includes a facing portion facing the handle from above the handle, and a surrounding portion that is a portion around the facing portion and protrudes downward from the facing portion.

This hardly causes an interference between the hand of the occupant and the roof when the occupant grasps the handle.

A ninth aspect is the vehicle according to the sixth aspect, wherein the roof includes an upper surface on which a gutter is formed, and a lower surface on which a ridge is formed in a portion corresponding to the gutter, and a portion continuous to the handle in the at least one pole is located under the ridge, and the handle protrudes inward from the ridge in a vehicle-width direction.

Since the handle is located away from the ridge, this hardly causes an interference between the hand of the occupant and the roof when the occupant grasps the handle.

A tenth aspect is the vehicle according to the second aspect, wherein the handle is provided in an area between a front end and a rear end of the seat surface in the forward and backward direction.

Consequently, the handle portion is easily accessible to the occupant while clearing the passage in the vehicle.

An eleventh aspect is the vehicle according to the second aspect, wherein the handle is thinner than the pillar.

This allows the handle portion to be easily grasped while the support stiffness of the pillars is maintained.

A twelfth aspect is the vehicle according to the first aspect, wherein at least a part of the handle is exposed from remaining portions of the vehicle in a side view of the vehicle.

This facilitates visually recognizing the handle when the occupant gets on the vehicle from outside.

A thirteenth aspect is the vehicle according to the first aspect, wherein the at least one seat comprises a first seat including a driver seat, and the handle is provided at a position corresponding to the first seat.

Consequently, the handles are easily accessible to the occupant on the first seat.

A fourteenth aspect is the vehicle according to the first aspect, wherein the at least one seat comprises a first seat including a driver seat, and a second seat behind the first seat, and the handle is provided at a position corresponding to the second seat.

Consequently, the handles are easily accessible to the occupant on the second seat.

A fifteenth aspect is the vehicle according to the first aspect, wherein the at least one seat comprises a first seat including a driver seat, and a second seat behind the first seat, and the handle is provided at each position corresponding to the first seat and the second seat.

Consequently, the handles are easily accessible to the occupants on the first seat and the second seat.

A sixteenth aspect is the vehicle according to the fifteenth aspect, wherein the at least one pole includes a first pole with the handle for the first seat, and a second pole with the handle for the second seat, the second pole being provided separately from the first pole.

This can shorten the first pole and the second pole and facilitates manufacturing of the poles each including the handle, more than those when one pole includes the handle for the first seat and the handle for the second seat.

A seventeenth aspect is the vehicle according to the fifteenth aspect, wherein the seat surface of the second seat is higher than the seat surface of the first seat, and the handle for the second seat is higher than the handle for the first seat.

Consequently, the handles are easily accessible to the occupants on the first seat and the second seat.

An eighteenth aspect is the vehicle according to the first aspect, wherein the rod is a component obtained by bending a circular pipe.

This facilitates manufacturing of the poles each including the handle.

A nineteenth aspect is the vehicle according to the eighteenth aspect, wherein the handle includes a straight portion and a curved portion.

This facilitates manufacturing of the poles each including the handle.

A twentieth aspect is the vehicle according to the first aspect comprising a frame body supporting the seat surface, wherein the at least one pole including the main body and the handle is used as at least one pillar extending upward from the frame body.

In this case, a part of the pillar can be used as a handle.

The foregoing description is in all aspects illustrative and does not restrict this invention. Numerous modifications and variations that have not yet been exemplified are devised without departing from the scope of this invention.

The invention claimed is:

1. A vehicle, comprising:
at least one seat including a seat surface; and
at least one pole including a rod higher than the seat surface, the rod including a main body and a handle extending from the main body with bends so that an occupant to be seated on the at least one seat can grasp the handle,
wherein the rod is a component obtained by bending a pipe.

2. The vehicle according to claim 1, further comprising a pillar,
wherein the main body is connected to an upper end of the pillar and extends in a forward and backward direction.

3. The vehicle according to claim 2,
wherein the handle protrudes from the main body in a direction orthogonal to an axial direction of the main body.

4. A vehicle, comprising:
at least one seat including a seat surface;
at least one pole including a rod higher than the seat surface, the rod including a main body and a handle extending from the main body with bends so that an occupant to be seated on the at least one seat can grasp the handle; and
a pillar,
wherein the main body is connected to an upper end of the pillar and extends in a forward and backward direction, and
the handle protrudes inward from the main body in a vehicle-width direction.

5. The vehicle according to claim 4,
wherein the handle further protrudes downward from the main body in the vehicle-width direction.

6. The vehicle according to claim 4, further comprising a roof supported by the at least one pole.

7. The vehicle according to claim 4, further comprising a roof supported by the main body.

8. A vehicle, comprising:
at least one seat including a seat surface;
at least one pole including a rod higher than the seat surface, the rod including a main body and a handle extending from the main body with bends so that an occupant to be seated on the at least one seat can grasp the handle;
a pillar; and
a roof supported by the at least one pole,
wherein the main body is connected to an upper end of the pillar and extends in a forward and backward direction, and
a lower surface of the roof includes a facing portion facing the handle from above the handle, and a surrounding portion that is a portion around the facing portion and protrudes downward from the facing portion.

9. The vehicle according to claim 6,
wherein the roof includes an upper surface on which a gutter is formed, and a lower surface on which a ridge is formed in a portion corresponding to the gutter, and a portion continuous to the handle in the at least one pole is located under the ridge, and the handle protrudes inward from the ridge in the vehicle-width direction.

10. The vehicle according to claim 2,
wherein the handle is provided in an area between a front end and a rear end of the seat surface in the forward and backward direction.

11. The vehicle according to claim 2,
wherein the handle is thinner than the pillar.

12. The vehicle according to claim 1,
wherein at least a part of the handle is exposed from remaining portions of the vehicle in a side view of the vehicle.

13. The vehicle according to claim 1,
wherein the at least one seat comprises a first seat including a driver seat, and the handle is provided at a position corresponding to the first seat.

14. The vehicle according to claim 1,
wherein the at least one seat comprises a first seat including a driver seat, and a second seat behind the first seat, and
the handle is provided at a position corresponding to the second seat.

15. The vehicle according to claim 1,
wherein the at least one seat comprises a first seat including a driver seat, and a second seat behind the first seat, and
the handle is provided at each position corresponding to the first seat and the second seat.

16. A vehicle, comprising:
at least one seat including a seat surface; and
at least one pole including a rod higher than the seat surface, the rod including a main body and a handle extending from the main body with bends so that an occupant to be seated on the at least one seat can grasp the handle, wherein the at least one seat comprises a first seat including a driver seat, and a second seat behind the first seat, the handle is provided at each position corresponding to the first seat and the second seat, and the at least one pole includes a first pole with the handle for the first seat, and a second pole with the handle for the second seat, the second pole being provided separately from the first pole.

17. The vehicle according to claim 15, wherein the seat surface of the second seat is higher than the seat surface of the first seat, and the handle for the second seat is higher than the handle for the first seat.

18. The vehicle according to claim 1, wherein the rod is a component obtained by bending a circular pipe.

19. The vehicle according to claim 18, wherein the handle includes a straight portion and a curved portion.

20. A vehicle, comprising:

at least one seat including a seat surface;

at least one pole including a rod higher than the seat surface, the rod including a main body and a handle extending from the main body with bends so that an occupant to be seated on the at least one seat can grasp the handle; and a frame body supporting the seat surface, wherein the at least one pole including the main body and the handle is used as at least one pillar extending upward from the frame body.

* * * * *